March 16, 1965 D. J. FRENCH 3,173,497
HARROW ATTACHMENT
Filed Jan. 24, 1963 2 Sheets-Sheet 1
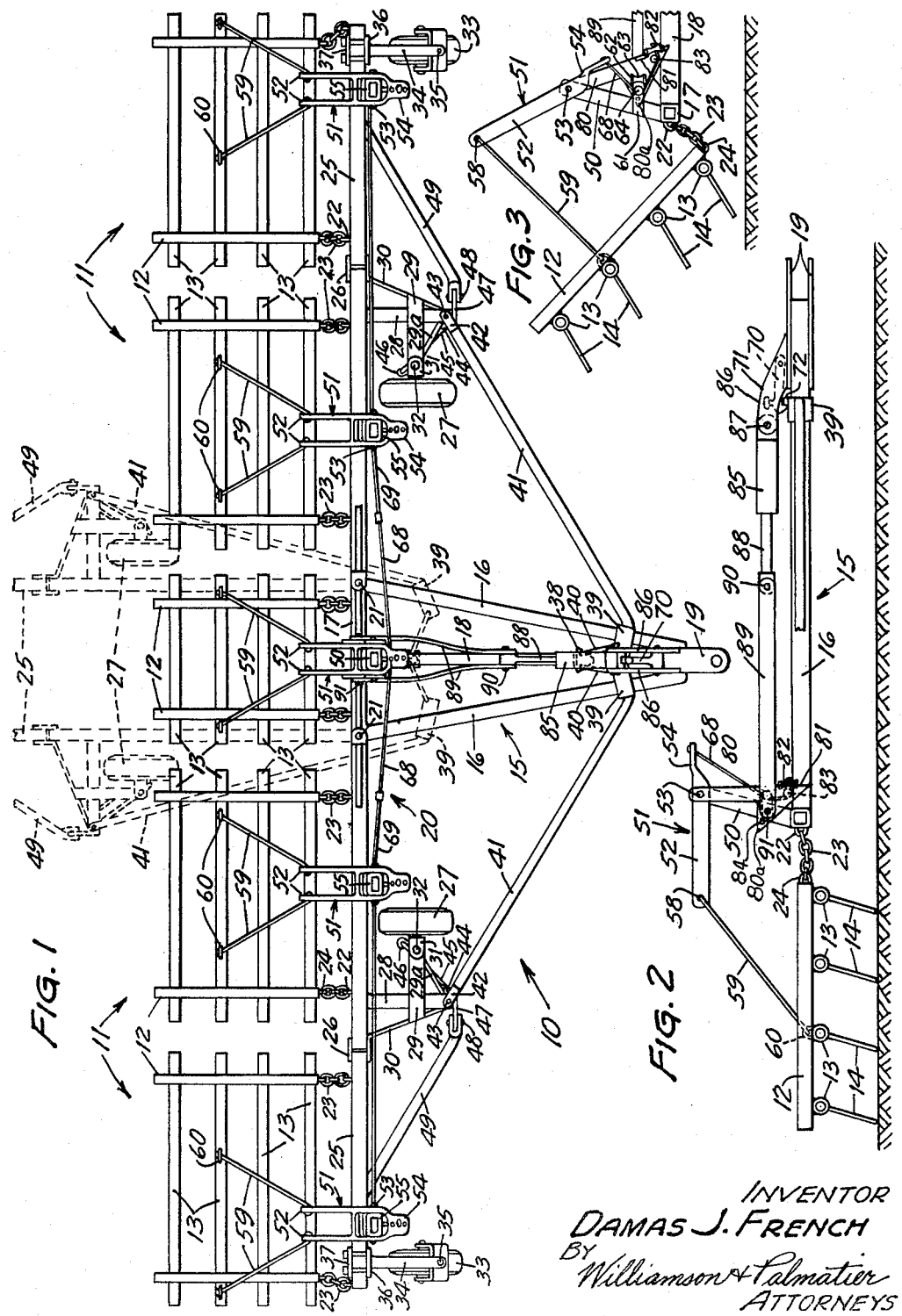
INVENTOR
DAMAS J. FRENCH
BY Williamson + Palmatier
ATTORNEYS

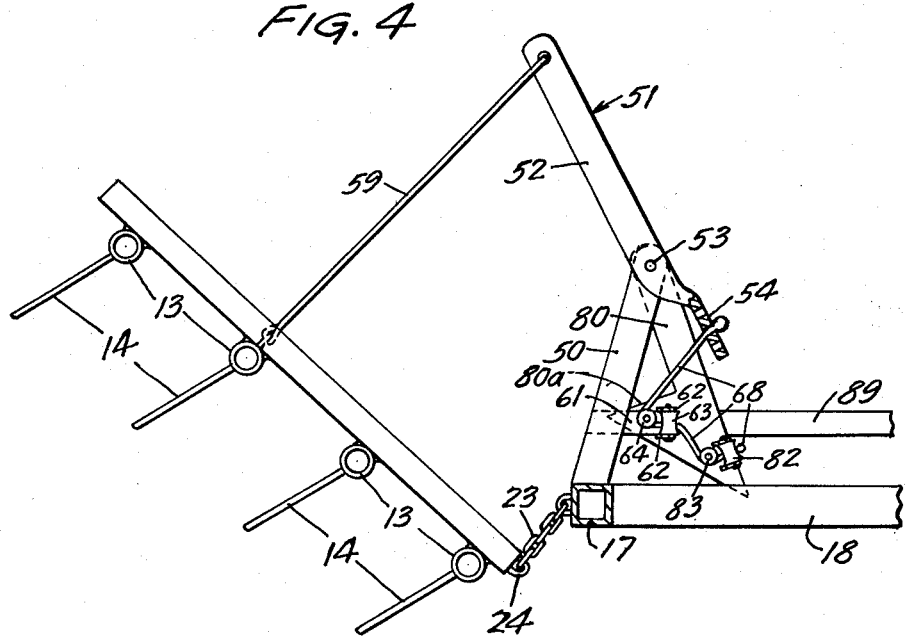

United States Patent Office 3,173,497
Patented Mar. 16, 1965

3,173,497
HARROW ATTACHMENT
Damas J. French, 131 Hill Ave., Grafton, N. Dak.
Filed Jan. 24, 1963, Ser. No. 253,708
6 Claims. (Cl. 172—456)

This invention relates to a foldable drag cart for use in carrying harrow sections and having provisions for an elevating mechanism to permit raising and lowering of the harrow sections, and more specifically this invention is a continuation-in-part application to my co-pending application, Serial No. 227,850 now Patent No. 3,122,210.

An object of this invention is to provide a novel foldable drag cart, of inexpensive construction and operation, adapted to drag a plurality of harrow sections and having means for vertically shifting the harrow sections automatically in response to folding movement of the drag cart, and also having separate means for positively shifting the harrow sections vertically independently of the folding action of the drag cart.

Another object of this invention is to provide a novel foldable tractor drawn drag cart for towing a plurality of harrow sections, and being arranged and constructed to automatically and vertically shift the harrow sections during folding of the cart, or to selectively raise and lower the harrow sections when the cart is in the expanded operative position whereby an operator through actuation of controls from the tractor may cause the sections to be elevated for cleaning or the like.

A more specific object of this invention is to provide a novel and improved foldable drag cart of the class described wherein the means for vertically shifting the harrow sections includes an elongate flexible cable which is automatically tensioned during the folding operation of the drag cart to raise the harrow sections, and a hydraulic actuator mechanism having linkage connections with the flexible cable for tensioning the same and which is controlled from the tractor thereby permitting selective raising of the harrow sections while the drag cart is in operative unfolded condition.

These and other objects and advantages of my invention will more fully appear from the following description made in connection with the accompanying drawings wherein like character references refer to the same or similar parts throughout the several views, and in which:

FIG. 1 is a top plan view of the drag cart being illustrated in full lines in the opened condition, and showing in dotted lines the drag cart in folded position;

FIG. 2 is a side elevational view upon an enlarged scale illustrating the mechanism for vertically shifting the harrow sections while the cart is in the expanded operative condition and with the harrow sections in the lowered position;

FIG. 3 is a side elevational view similar to FIG. 2 and on the same scale but illustrating the harrow sections in the elevated position; and FIG. 4 is a side elevational view similar to FIG. 3 but on a larger scale and with certain parts thereof broken away to more clearly illustrate the mechanism disclosed.

Referring now to the drawings it will be seen that one embodiment of my novel foldable drag cart, designated generally by the reference numeral 10, is thereshown. It will be seen that the drag cart is illustrated in FIG. 1 in towing relation with respect to a plurality of harrow sections 11. These harrow sections are of conventional construction and each includes a pair of longitudinally extending frame members 12 which are connected by a plurality of transversely extending frame members 13, the latter having a plurality of harrow teeth 14 secured thereto and depending therefrom. The harrow sections 11 are connected to the drag cart and are arranged in side-by-side relation in the usual manner.

The drag cart 10 is comprised of an elongate generally triangular shaped draft frame or tongue 15 preferably constructed of a suitable rigid metallic material and including a pair of side frame elements 16 which converge forwardly and which are rigidly interconnected at their respective rear end portions by a transverse frame element 17. The tongue 15 also includes a central element which is rigidly connected to the median portion of the transverse frame element 17 and which extends forwardly therefrom. It will be seen that the forward end of the central frame element 18 has a clevis 19 rigidly secured thereto and which is secured to the front end of the side frame elements 16. This clevis 19 is connectible to the draw bar of a tractor in the conventional manner.

Drag cart 10 is also comprised of a pair of frame structures 20 which are swingably connected to the tongue 15 adjacent the rear end thereof and these frame structures normally extend transversely outwardly from the tongue and in alignment with each other for dragging the harrow sections over the ground. It will be seen that the frame structures 20 are pivotally connected to the opposite ends of the transverse frame elements 17 about pivot pins 21 and are adapted to swing rearwardly about the pivot in substantially longitudinal relation to the tongue 15.

The frame structures 20 as well as the transverse frame elements 17 of the tongue 15 are provided with a plurality of rearwardly projecting eyes 22 at longitudinally spaced points therealong. Short chain links 23 interconnect the eyes 22 with associated eyes 24 secured to the forward ends of the harrow frame sections 12 so that a flexible connection is provided between the harrow cart and the harrows. This flexible connection permits vertical floating movement of the harrow sections during the traversing movement over the surface of the ground and also allows the harrow sections to be elevated to a transport position in a manner to be more fully described hereinbelow.

A lateral section 25 is provided for each frame structure 20 and each of these lateral sections is hingedly connected to its associated frame structure by hinge connection 26 so that these lateral or outer sections are vertically swingable about a substantial horizontal axis extending in the direction of travel of the cart.

These lateral or outer frame sections 25 are also provided with suitable eyes 22 which are connectible by short chain links to eyes 24 on the harrow sections to which these outer frame sections are connected. Thus it will be seen that these outer frame sections 25 actually constitute extensions of the frame structures 20 and the hinge connection between each frame structure and its associated outer frame section allows vertical floating movement of this outer frame section to facilitate traversal of uneven terrain.

Means are also provided for supporting the frame structures 20 above the ground and for urging the same inwardly into substantially longitudinally extending relation with respect to the tongue as the drag cart is pulled. In the form shown, such means includes a pair of ground engaging support wheels 27 which are mounted on their associated frame structures in substantially identical fashion. Each of these frame structures 20 has a rigid, forwardly extending frame element 28 fixedly secured thereto as by welding. A pair of vertically spaced-apart identical plates 29 are rigidly secured to the upper and lower surfaces of the frame elements 28 and project laterally therefrom. It will be noted that these plates 29 are disposed in substantially parallel relation with respect to the associated frame structures 20. A suitably arranged oblique bracing bar 30 has one of its ends rigidly secured to the associated frame structure 20 and has the other end thereof secured to the forward end portion of the frame element 28 while the intermediate portion of the brace bar is rigidly secured to the plates 29. The innermost ends of the plates 29 associated with each frame element 28 has the upper and lower ears of a wheel mounting 31 swingably mounted thereon by pivot 32 to thereby permit turning of the wheel mounting on its vertical axis relative to the corresponding frame structure 20 and the tongue 15.

The outermost ends of each of the outer frame sections 25 is supported by a suitable castor wheel 33 as best seen in FIG. 1. It will be noted that the castor wheel 33 is pivotally connected to a standard 34 by means of a vertical pivot 35 thereby permitting a castor wheel to freely pivot about a substantially vertical axis.

The standard 34 of each castor wheel has a rigid plate 36 fixedly attached to the rear end portion thereof which engages the front surface of the associated outer frame section 25. A plate 37 cooperates with the rigid plate 36 of each castor wheel standard and is clamped against the rear surface of the outer frame section by means of suitable bolt assemblies thereby permitting the castor wheel assembly to be detachably secured to its associated outer frame section.

A camming linkage mechanism is also provided for each frame section 20 to facilitate rearward swinging movement of the frame structure from the transverse operative position to the folded transport position. This camming linkage mechanism also serves to turn the ground engaging wheels relative to the tongue 15 and relative to the corresponding frame structures 20 in response to rearward swinging of the frame structure so as to turn these ground engaging wheels 27 into planes extending obliquely to the central frame element 18 of the tongue and then into planes generally parallel to the central frame element 18 of the tongue as these frame structures 20 are swung rearwardly into the transport position. In the embodiment shown, the camming linkage mechanism includes a center sleeve member 38 which is mounted for sliding movement on the central frame element 18 of the tongue 15. The linkage mechanism also includes a pair of outer sleeve members 39 each being mounted on one of the side frame elements 16 of the tongue 15. It will be seen that the center sleeve member 38 is connected to the outer sleeve members 39 by suitable links 40 so that rearward movement of the center sleeve 38 will also cause corresponding rearward movement of the sleeve members 39.

Each of the outer sleeve members 39 has an elongate control or guiding link 41 rigidly secured thereto and projecting outwardly therefrom. The control links 41 are preferably constructed of rigid tubing in the form shown and each has its outer end bifurcated as at 42, this bifurcated end of each link being swingably connected on a pivot 43 to the forward terminal portion of the frame element 28. It will be seen that the outer end portions of each control link 41 is provided with an apertured ear 44 which has one end of a timing link 45 pivotally secured thereto. The other end of the timing link 45 is pivotally secured to an apertured ear 46 carried by the wheel mounting 31 so that the motion and force exerted by the control link 41 will be transmitted to the wheel mounting by the associated timing link.

It is also pointed out that in order to impart rigidity to the innermost end of the plates 29 which support each wheel mounting, a diagonal bracing member in the form of a bar 29a is provided which extends between and is rigidly connected to the outermost ends of each pair of upper and lower plates 29 and the forward end portion of the associated frame element 28. It will also be seen that each frame element 28 is provided with a bracket 47 which projects laterally outwardly therefrom and which is pivotally secured by a pivot 48 to the bifurcated end of a link 49, the latter being rigidly secured to the forward portion of one of the outer frame sections 25. Thus it will be seen the motion and force transmitted through the control link 41 will also be transmitted through the control link 49 to the outer frame section 25 associated therewith and its corresponding castor wheel. This arrangement facilitates swinging movement of one of the frame structures and its associated outer frame section since some of the force will be transmitted directly to the associated outer frame section.

Means are also provided for automatically and seqentially raising the harrow sections 11 from the normal horizontal drag position to an elevated transport position in response to folding of the drag cart. This elevating mechanism includes a central mounting member or post 50 which is rigidly affixed as by welding to the median upper surface portion of the transverse frame element 17 of the tongue 15. This mounting post is inclined slightly forwardly and is preferably secured to the central frame element 18 as by welding or the like. An elevating arm 51 is pivotally connected to the upper terminal portion of the mounting post 50 and it will be seen that this elevating arm includes a pair of arm elements 52 which are rigidly interconnected and which are disposed in substantially parallel relation. The arm elements 52 are positioned on opposite sides of the upper terminal portion of the mounting post 50 and a pivot secures the arm elements to these mounting posts 50 to permit vertical swinging movement of the elevating arm about a substantially horizontal axis spaced above and substantially parallel to the central frame element 17. The forward terminal portions of the arm elements 52 are rigidly interconnected by a substantially flat attachment portion 54 which is provided with a plurality of longitudinally aligned apertures therein.

Each of the frame structures 20 and each of the outer frame sections 25 is provided with a mounting post or member 55 which is disposed in substantially parallel relation with respect to the central mounting post 50 and which is similar in construction to the central mounting post. It is pointed out, however, that the mounting post 55 is detachably mounted upon its associated frame structure and outer frame section to thereby permit removal thereof or adjustment along this supported structure. It is pointed out that each mounting post 55 is provided at its lower end with an inverted U-shaped mounting bracket rigidly secured thereto which is positioned in clamped relation with its associated frame structure or outer frame section in the manner of my co-pending application, Serial No. 227,850.

Each of these mounting posts 55 as well as the central mounting post 50 is provided with an elevating arm 51 including a pair of arm elements 52 pivotally connected to the post 55 by a pivot 53. Each of the elevating arms 51 for these mounting posts 55 also has an attachment portion 54 joining the arm elements 52 at the forward ends thereof, these attachment portions having a plurality of longitudinally aligned apertures therein.

It will be seen that each of the arm elements 52 of each elevating arm 51 has an aperture 58 in the rear portion thereof. A pair of flexible elements in the form of ropes as illustrated extend between and are connected to each elevating arm and each harrow section associated therewith. It will be seen that each of these flexible elements 59 of each pair has one end secured to one of the arm elements 52 of its associated elevating arm and has its other end secured to suitable eyes mounted on one of the center transverse frame elements 13 of each harrow section 11. Referring now to FIG. 2 it will be seen that when the elevating arms 51 are disposed in their lowered horizontal position, the harrow sections will also be disposed in the horizontal relation so that the teeth thereof will engage the surface of the ground. It will further be noted that when the elevating arms 51 are vertically swung to their elevated position, the harrow sections will be vertically elevated about their flexible connection with the drag cart. To this end it will be noted that the flexible elements or ropes 59 are connected to their associated harrow sections rearwardly of the flexible coupling between the harrow section and its associated frame structure or outer frame sections. Thus the rear ends of the harrow sections will be tilted during the elevating operation.

The harrow elevating mechanism also includes means for pivoting the elevating arms 51 so that the harrow sections carried by the outer frame sections 25 will be elevated to the transport position as are the frame structures 20. Referring now to FIG. 2 it will be seen that the central mounting post 50 has a mounting bracket secured thereto and which includes a pair of substantially identical bracket plates 61 secured to opposite sides of the post 50 and projecting forwardly therefrom. It will be noted that these bracket plates 61 are disposed in vertical planes and are arranged in substantially parrallel relation with respect to each other. Rigidly affixed to the outer end portions of the bracket plates 61 are upper and lower mounting plates 62 which are also disposed in substantially parallel relation with respect to each other. A pair of vertically disposed rollers 63 each has its respective axle extending between and connected to the upper and lower bracket plates 62 so that the rollers 63 are revolvable about substantially vertical axes. Positioned rearwardly of the vertical rollers 63 and extending between and revolvably supported from the bracket plates 61 is a horizontal roller 64 as best seen in FIG. 3.

Referring now to FIG. 1 it is pointed out that the U-shaped mounting bracket which mounts the post 55 on the frame structures 20 and the outer frame structures 25 has a pulley unit mounted thereon in the manner of my co-pending application, Serial No. 227,850. A pair of elongate flexible members 68 are provided for vertically shifting the elevating arms and each of these flexible members 68 has one end secured to one of the outermost elevating arms 51. Thus it will be noted that the outermost end of each cable or rope projects through one of the apertures of its associated elevating arm attachment portion and extends downwardly therefrom around the pulley unit carried by the outermost associated mounting post 55. The cables 68 then extend inwardly and are trained around the pulley unit carried by the mounting post 55 mounted on the frame structure 20 and has its innermost end secured to the attachment portion of the elevating arm 51 carried by the center mounting post 50. It is preferred that the respective inner ends of the cables 68 extend through the same aperture in the attachment portion of the central elevating arm so that the points of connection of the cable are substantially the same with respect to this center elevating arm. However, the cable may also be attached to adjacent apertures if it is so desired.

Each of the elevating arms 51 carried by the frame structures 20 have one end of a relatively short flexible element or cable 69 secured thereto, the other end of the cable 69 being secured to the cables 68 at a point located between the associated mounting post 55 and the central mounting post 50. Thus when tension is exerted on the ropes 68, so that the direction of the tension is exerted inwardly, the flexible element or cable 69 will also be tensioned. It will therefore be seen that when the harrow cart is folded or collapsed to the transport position from the operative expanded position, the cables or flexible elements 68 will be progressively tensioned to thereby cause elevation of the harrow sections 11 during this folding operation. Conversely when the drag cart is expanded from the folded transport position, the tension on the flexible elements 68 will be progressively lessened therefore causing lowering of the harrow sections to the drag position.

Means are also provided for releasably locking the drag cart in the expanded position and to this end a hook-shaped lock element 70 is pivotally connected between upstanding ears 71 mounted on the clevis 19 for vertical swinging movement about a substantially horizontal axis. The upper portion of each of the outer sleeve members 39 are provided with upstanding lock engaging elements or lugs 72 adjacent the front inner peripheral edge areas thereof. These lock engaging elements or lugs 72 are engageable with the lock elements 70 when the drag cart is in the expanded position thus preventing rearward swinging movement of the frame structures 20 about their respective pivots 21. When the lock elements 70 are disengaged from the lock engaging element 72, the frame structures 20 are therefore free to pivot about their respective pivots. Although not illustrated in the drawings, the lock elements 70 may be readily shifted between locked and released condition by an actuating mechanism located adjacent the operator on the tractor. Such actuating mechanism may include an electro-mechanical system including a solenoid or may include a mechanical linkage.

Quite often it becomes necessary to elevate the harrow sections while the drag cart is in the operative expanded position for the purpose of permitting the tines or teeth of the harrow sections to be cleaned of debris. On other occasions, it is desirable to elevate the harrow sections when traversing an area which is extremely moist and compacted. It is therefore desirable to provide means for raising the harrow sections 11 while the drag cart is in the expanded operative position and independently of the folding action thereof. To this end, it will be seen that a pair of cable tensioning arms 80 of substantially identical configuration are pivotally connected at their respective upper ends to the central mounting post 50 by the pivots 53 to permit swinging of these arms in unison about a substantially horizontal transverse axis. These arms 80 are integrally joined at their respective lower front ends by a connecting portion 81 and it will be seen that this connecting portion 81 is provided with apertures to permit the passage of the cables 68 therethrough. Although only one is shown, a pair of vertically disposed rollers 82 are connected by the connecting portion 81 and about which the cables 68 are trained. A small horizontal roller or pulley 83 is positioned rearwardly of the connecting portion 81 and the cables 68 are trained around this roller to facilitate longitudinal movement of the cable during tensioning thereof. Each of the tensioning arms 80 has a rearwardly projecting portion 80a suitably apertured as at 84 to permit a retaining pin to be positioned therein. It will be seen that when the tensioning arms 80 are moved to the position as illustrated in full lines of FIG. 3, the arms may be retained in this advanced tensioning condition by the engagement of such a retaining pin abutting against the post 50.

Means are also provided for selectively shifting the arms 80 and this means includes a hydraulic cylinder 85 pivotally connected to suitable mounting ears 86 by a pivot pin 87. The hydraulic cylinder 85 is of the double acting type and is provided with a piston rod 88 for axial movement therein in the conventional manner. The piston rod 88 has its rear end pivotally connected to a pair of elongate links 89 by pivot pin 90 whereby axial movement of the piston rod 88 also causes corresponding axial movement of the links 89. The links 89 are each pivotally connected to one of the arms 80 by a pivot 91 so that axial shifting of the links 89 causes swinging of the arms 80 about their respective axes. Thus it will be seen that the cables 68 will be tensioned by swinging movement of the arms 80. The piston 85 will be connectible by suitable conduits to the hydraulic fluid pressure system of the tractor so that the operator may selectively elevate the harrow sections 11 independently of the swinging movement of the drag cart.

During operation of the drag cart, the clevis 19 will be connected to the draw bar of the tractor so that the drag cart will be towed thereby. When the drag cart is in the expanded position, the elevating arms will be disposed in substantially horizontal and the rope or cable elements 68 will be in the untensioned condition thereby permitting the harrow sections to be disposed in ground engaging operative relation. The tensioning arms 80 will be disposed in the position illustrated by dotted line configuration in FIG. 2 whereby the arms do not exert any tension on the cables 68. When the drag cart 10 is in this condition, the lock element 70 will be disposed in engaging relation with respect to the lock engaging elements 72 whereby when the drag cart is towed forwardly by the tractor, the cart will be maintained in the expanded position.

However, when the lock element 70 is disengaged from the lock engaging elements 72, the harrow sections 11 will produce a drag or inertia or load on the frame structures 20 as well as the outer frame sections 25 thereby causing the frame structures to pivot about their respective pivots 21. This swinging movement also produces a sliding movement of the center sleeve member 38 along the frame element 18 and sliding movement of the outer sleeve 39 along the side frame element 16 of the tongue 15. This produces a swinging of the control links 41 and the timing links 45 which causes a turning of the wheel mounting 31 and wheels 27 into oblique relation with respect to the tongue.

The wheels are then oriented so as to converge with each other in forward movement along the ground. This converging motion of the wheels tends to urge the frame structures 20 inwardly towards their second position as indicated in dotted line configuration in FIG. 1. As the frame structures move towards their second position, sliding of sleeves 38 and 39 and swinging of the linking mechanism continues and as the frame structures approach the transport position wherein they are substantially parallel to each other, the linkage mechanism causes the wheel mountings and the wheels to turn against so as to orient the wheels in substantially parallel relation with the tongue and the wheels are thereby oriented for travel along the highway.

As in my co-pending application, Serial No. 227,850, the frame structures 20 during this swinging movement from the expanded transverse position to the folded longitudinal position cause progressive tensioning of the flexible cables 68. Thus tensioning of the cables 68 causes vertical swinging movement of the elevating arms about their respective axes of pivot which also causes swinging movement of the harrow sections about their coupling connections with the frame structures.

When it is desirable to expand or unfold the drag cart, the tractor is driven in the reverse direction which produces a rearward thrust on the tongue which in turn tends to urge the tongue through the sleeves 38 and 39 causing turning of the wheels 27 first into oblique relation to the tongue and then into the position illustrated in full lines in FIG. 1. The frame structures 20 will also be caused to swing to the expanded position and this movement also causes release of the tension on the cables 68 whereby the harrow sections will be lowered by action of gravity. When in the fully expanded position, the lock elements 70 will thereafter be shifted into engaging relation with the lock engaging elements 72. The drag cart will then be in condition for operation.

During the harrowing operation, it becomes necessary to raise the harrow sections to facilitate cleaning of debris and other material therefrom. In other instances it is also desirable to raise the harrow sections when traversing terrain which is extremely boggy and which might result in bogging down of the harrow sections. When raising the harrow sections under these conditions, it is also desirable to maintain the drag cart in the expanded condition and it will be seen that this can be readily accomplished by retracting the piston rod 88 which acting through the linkage connections 89 causes swinging movement of the tensioning arms 80 about their respective axes of pivot. This forward swinging of the tensioning arms 80 produces progressive tensioning of the cables 68 and thereby causes raising of the respective harrow sections. Conversely, extension of the piston rod 88 causes rearward shifting of the tensioning arms 80 which in turn release the tension on the cables 68 thereby permitting the harrow sections to be lowered by action of gavity. Thus it will be seen that I have provided means for positively raising and lowering the harrow sections independently of the folding action of the drag cart.

From the foregoing it will therefore be seen that I have provided a novel and improved drag cart attachment which not only permits automatic raising of the respective harrow sections carried thereby during the folding operation of the drag cart into the transport position, but provision is also made for permitting raising and lowering of the harrow sections independently of this folding operation. Therefore maximum use of the draft force of the tractor is obtained during the folding operation of the drag cart whereby raising of the harrow sections is automatically accomplished.

It will further be seen that the independent means for raising and lowering the harrow sections independently of the folding operation are controlled from the tractor by the operator thereby permitting raising and lowering of these sections selectively at the will of the operator.

It will therefore be seen that I have provided a novel and improved drag cart, which is not only of inexpensive construction and operation, but one which functions in a more efficient manner than any heretofore known comparable devices.

It will of course be understood that various changes may be made in the form, details, arrangement and proportions of the various parts without departing from the scope of my invention.

What is claimed is:

1. A tractor attachment for transporting harrow sections and the like, said attachment comprising a fore-and-aft tongue connectible to a tractor, an elongate sectional frame including a plurality of frame structures extending transversely of the tongue and being swingably connected thereto for fore-and-aft swinging movement between said transversely extending position and a transport position in generally longitudinal relation to the tongue, said frame structures having draft coupling connections thereon adapted for ready connection to a plurality of trailing harrow sections disposed rearwardly of the frame structures and arranged in side-by-side relation with respect to each other, means releasably interlocking said frame structure in transversely extending relation with said tongue, ground engaging wheels supporting the frame for travel over the ground, linkage means interconnecting said tongue and said frame structures and cooperating with the latter when said interlocking means is released to cause swinging movement of the frame structures to the transport position during forward movement of said attachment, elevating mechanism mounted on said tongue and said frame structures and including elongate flexible cable means adapted to be connected with the harrow sections at points rearwardly of the coupling connections between the harrow sections and frame structures, and being automatically operated in response to swinging movement of said frame structure towards the transport position to cause upward swinging movement of the harrow sections about their respective coupling connections with the frame structure, and actuating mechanism mounted on said tongue and connected with said cable means and being actuable to positively operate the elevating mechanism when the frame structures are in the transversely extending relation with respect to said tongue to thereby permit positive raising and lowering of the harrow sections independently of swinging movement of the frame structures.

2. A tractor attachment for supporting harrow sections and the like, said attachment comprising a fore-and-aft tongue connectible to the tractor, an elongate sectional frame including a plurality of frame structures extending transversely of the tongue and swingably connected thereto for fore-and-aft swinging movement between said transversely extending position and a transport position in generally longitudinal relation to the tongue, said frame structures having draft coupling connections thereon adopted for ready connection to a plurality of trailing harrow sections disposed rearwardly of the frame structures and arranged in side-by-side relation with respect to each other, means releasably interlocking said frame structures in transversely extending relation with said tongue, ground engaging wheels supporting the frame for travel over the ground, elevating means for automatically raising and lowering the harrow sections in response to swinging movement of the frame structures, said elevating means including a plurality of elevating arms each being pivotally mounted on one of said frame structures for vertical swinging movement between the lowered substantially horizontal position and upstanding elevated position about a substantially horizontal axis spaced above and substantially parallel to the associated frame structure, each arm being connectible to one of the harrow sections at a point spaced rearwardly of the coupling connection between the harrow section and the frame structures, means operatively connected with each arm and being automatically operated in response to swinging movement of said frame structures towards the transport position to cause swinging movement of the arm from the lowered position to the elevated position to thereby cause corresponding upward swinging movement of the harrow sections about its coupling connection with the frame structures, and an actuating mechanism operatively connected with said arm swinging means and being actuable to positively actuate said arm swinging means when the frame structures are in transversely extending relation with respect to the tongue to thereby permit positive raising and lowering of the harrow sections independently of swinging movement of the frame structures.

3. The structure as defined in claim 2 wherein said arm swinging means comprises an elongate flexible cable connected with said elevating arm, and means on said frame structures and tongue for tensioning said flexible cable in response to swinging movement of the frame structure towards the transport position to cause vertical swinging movement of the arm.

4. A tractor attachment for dragging and transporting harrow sections and the like, said attachment including a fore-and-aft tongue connectible to a tractor, an elongate sectional frame including a plurality of frame structures extending transversely of the tongue and being swingably connected thereto for fore-and-aft swinging movement between said transversely extending position and a transport position in generally longitudinal relation to the tongue, said frame structures and tongue having draft coupling connections thereon adapted for connection to a plurality of trailing harrow sections disposed rearwardly of the frame structures and arranged in side-by-side relation with respect to each other, means releasably interlocking said frame structures in transversely extending relation with said tongue, ground engaging wheels supporting the frame for travel over the ground, elevating means for automatically raising and lowering the harrow sections in response to swinging movement of said frame structures, said means including a plurality of spaced-apart elevating arms mounted on said frame structures and tongue and each being vertically swingable between the lowered substantially horizontal position and upstanding elevated position about a substantially horizontal axis spaced above the tongue and frame structures, each of said arms being adapted for connection with one of said harrow sections at points rearwardly of the harrow coupling connection with the attachment, elongate flexible cable means connected with each of said elevating arms, guide and tensioning means on said frame structures and causing automatic tensioning of the cable means in response to swinging movement of said frame structures towards the transport position to cause vertical swinging movement of the elevating arms from the lowered position to the elevated position and to thereby cause corresponding vertical swinging movement of the harrow sections to elevated position, and actuating means mounted on said tongue and being operatively connected with said cable means and being actuable to tension the same when the frame structures are in transversely extending relation with respect to the tongue to thereby permit positive raising and lowering of the harrow sections independently of swinging movement of the frame structures.

5. The structure as defined in claim 4 wherein said actuating means includes a tensioning arm mounted for shifting movement relative to said tongue and engaging said cable means to tension the same when shifted, and power means mounted on said tongue and connected to said shifting arm to cause shifting of the latter.

6. A tractor attachment for transporting harrow sections and the like, said attachment comprising a fore-and-aft tongue connectible to a tractor, an elongate sectional frame including a plurality of frame structures extending transversely of the tongue and being swingably connected thereto for fore-and-aft swinging movement between said transversely extending position and a transport position in generally longitudinal relation to the tongue, said frame structures having draft coupling connections thereon adapted for ready connection to a plurality of trailing harrow sections disposed rearwardly of the frame structures and arranged in side-by-side relation with respect to each other, means releasably interlocking said frame structures in transversely extending relation with said tongue, ground engaging wheels supporting the frame and tongue for travel over the ground, elevating means for automatically raising and lowering the harrow sections in response to swinging movement of said frame structures, said elevating means including a plurality of spaced-apart elevating arms mounted on said frame structures and tongue and each being swingable between a lowered substantially horizontal position and an upstanding elevated position about a substantially horizontal axis spaced above the tongue and frame structures, means adapted to connect each of said arms with one of said harrow sections at points rearwardly of the harrow coupling connection with the attachment, elongate flexible cable means connected with each of said elevating arms, a plurality of guide and tensioning elements mounted on said frame structures and tongue and being engageable by said cable means for tensioning the same in response to swinging movement of the frame structures towards the transport position to thereby cause upward swinging movement of the associated harrow sections about their respective coupling connections with the frame structures and tongue, actuating means operatively connected with said cable means for tensioning the same when the frame structures are in the transversely extending relation with respect to the tongue, said actuating mechanism including a tensioning arm swingably mounted on said tongue and engaging said cable means to cause tensioning thereof during swinging movement of said tensioning arm, power means mounted on said tongue and having linkage connections with said tensioning arm whereby upon operation of said power means, said tensioning arm may be selectively swung to vary the tension on said cable means whereby to permit positive raising and lowering of the harrow sections independently of swinging movement of the frame structures.

References Cited in the file of this patent
UNITED STATES PATENTS

| | | |
|---|---|---|
| 2,306,127 | Johnston et al. | Dec. 22, 1942 |
| 3,086,598 | Gellner | Apr. 23, 1963 |